United States Patent
Gaertner et al.

(10) Patent No.: US 12,482,364 B2
(45) Date of Patent: Nov. 25, 2025

(54) AIRPORT TAXI TIME INFORMATION

(71) Applicant: THE BOEING COMPANY, Chicago, IL (US)

(72) Inventors: Marco Gaertner, Sinntal-Sannerz (DE); Martin Baudin, Wiesbaden (DE)

(73) Assignee: THE BOEING COMPANY, Arlington, VA (US)

( * ) Notice: Subject to any disclaimer, the term of this patent is extended or adjusted under 35 U.S.C. 154(b) by 271 days.

(21) Appl. No.: 17/806,384

(22) Filed: Jun. 10, 2022

(65) Prior Publication Data

US 2023/0401966 A1    Dec. 14, 2023

(51) Int. Cl.
| | |
|---|---|
| G08G 5/51 | (2025.01) |
| G08G 5/22 | (2025.01) |
| G08G 5/26 | (2025.01) |
| G08G 5/56 | (2025.01) |
| G08G 5/72 | (2025.01) |

(52) U.S. Cl.
CPC .............. G08G 5/51 (2025.01); G08G 5/22 (2025.01); G08G 5/26 (2025.01); G08G 5/56 (2025.01); G08G 5/727 (2025.01)

(58) Field of Classification Search
None
See application file for complete search history.

(56) References Cited

U.S. PATENT DOCUMENTS

| | | | | |
|---|---|---|---|---|
| 6,278,965 | B1 * | 8/2001 | Glass | G08G 5/727 703/22 |
| 2010/0185426 | A1 * | 7/2010 | Ganesan | G08G 5/51 706/12 |
| 2014/0039783 | A1 | 2/2014 | White et al. | |
| 2014/0278036 | A1 * | 9/2014 | Ince | G08G 5/727 701/120 |
| 2016/0104383 | A1 * | 4/2016 | Chandran | G08G 5/32 701/120 |
| 2016/0210868 | A1 * | 7/2016 | Donovan | G08G 5/55 |

(Continued)

FOREIGN PATENT DOCUMENTS

| | | | | |
|---|---|---|---|---|
| EP | 3822949 A1 | | 5/2021 | |
| EP | 3992944 A1 * | | 5/2022 | ............. G01C 23/00 |
| WO | WO-2008061793 A1 * | | 5/2008 | ........... G08G 5/0043 |

OTHER PUBLICATIONS

Murça, Mayara Condé Rocha. "A robust optimization approach for airport departure metering under uncertain taxi-out time predictions." Aerospace science and technology 68 (2017): 269-277 (Year: 2017).*

(Continued)

*Primary Examiner* — Darlene Garcia-Guerra
(74) *Attorney, Agent, or Firm* — Moore IP Law

(57) ABSTRACT

A method of providing taxi time information for an airport includes receiving, at a computing system from a device, a request for taxi time information associated with an airport. The method includes determining, at the computing system based on aircraft location information data from a set of aircraft, taxi time information for the airport for a time window. The set of aircraft include aircraft that taxied at the airport within the time window. The time window is less than or equal to one day. The method also includes sending the taxi time information associated with the airport from the computing system to the device.

20 Claims, 8 Drawing Sheets

(56) References Cited

U.S. PATENT DOCUMENTS

| | | | | |
|---|---|---|---|---|
| 2018/0012499 | A1* | 1/2018 | Madhusudan | G08G 5/727 |
| 2019/0147752 | A1* | 5/2019 | Scarlatti | G08G 5/0043 |
| | | | | 701/120 |
| 2019/0316909 | A1* | 10/2019 | White | G06N 5/02 |
| 2020/0327587 | A1* | 10/2020 | Cabos | G06Q 30/0284 |
| 2022/0020281 | A1* | 1/2022 | Stoppok | G08G 5/22 |
| 2023/0162101 | A1* | 5/2023 | Jeong | G06Q 10/06311 |
| | | | | 705/7.13 |
| 2023/0186206 | A1* | 6/2023 | McFaddin | G06N 5/022 |
| | | | | 705/7.23 |
| 2023/0222924 | A1* | 7/2023 | Chua | G08G 5/003 |
| | | | | 701/120 |
| 2023/0230490 | A1* | 7/2023 | Lalisse-Bauvin | G08G 5/51 |
| | | | | 701/3 |

OTHER PUBLICATIONS

Wang, Xinwei, et al. "Aircraft taxi time prediction: Feature importance and their implications." Transportation Research Part C: Emerging Technologies 124 (2021): 102892 (Year: 2021).*
Levy, Benjamin S., and Jeffrey E. Legge. "Objective and automatic estimation of excess taxi-times." 2008 Integrated Communications, Navigation and Surveillance Conference. IEEE, 2008 (Year: 2008).*
Clare, Gillian, and Arthur G. Richards. "Optimization of taxiway routing and runway scheduling." IEEE Transactions on Intelligent Transportation Systems 12.4 (2011): 1000-1013 (Year: 2011).*
Extended European Search Report for application No. 23178371.3 dated Oct. 19, 2023, pp. 1-7.

* cited by examiner

AIRPORT TAXI TIME INFORMATION

FIELD OF THE DISCLOSURE

The present disclosure is related to systems and methods for providing airport taxi time information to a crew of an aircraft.

BACKGROUND

Information associated with taxi times at airports is useful for a crew of an aircraft. For example, taxi out information is usable by the crew of the aircraft to determine an amount of fuel to load on the aircraft, to determine when to start-up one or more engines, to determine when to have a de-icing treatment, to determine whether to use reduced-engine taxiing to limit fuel usage, to determine when to start-up remaining engines when reduced-engine taxiing is utilized, to make other determinations regarding the aircraft, or combinations thereof. As another example, taxi in information is usable by the crew of the aircraft to inform a ground crew when the aircraft will arrive at a stand (e.g., a gate at a terminal or a parking place near a terminal) so that the ground crew can process the aircraft for a turnaround. Airports publish average taxi times on a seasonal or monthly schedule, but real-time information about taxi times is not available to the operator of an aircraft.

SUMMARY

According to one implementation of the present disclosure, a method of providing taxi time information for an airport includes receiving, at a computing system from a device, a request for taxi time information associated with an airport. The method includes determining, at the computing system based on aircraft location information data from a set of aircraft, taxi time information for the airport for a time window. The set of aircraft include aircraft that taxied at the airport within the time window. The time window is less than or equal to one day. The method also includes sending the taxi time information associated with the airport from the computing system to the device.

According to another implementation of the present disclosure, a method of providing taxi time information for an airport includes receiving, at a computing system from a first device, a first request for taxi out time information associated with a first airport. The method includes determining, at the computing system based on first aircraft location information data from a first set of aircraft that departed from the first airport within a first time window, taxi out time information for the first airport. The method also includes sending the taxi out time information to the first device responsive to the first request.

According to another implementation of the present disclosure, a computer-readable storage device includes instructions that are executable by one or more processors. The instructions are executable by the one or more processors to send a request for taxi time information to a server. The request specifies an airport. The instructions are executable by the one or more processors to receive the taxi time information for the airport from the server in response to the request. The instructions are executable by the one or more processors to send, to a display device, a first graphical display element that depicts average taxi time information based on the taxi time information for a set of aircraft within a time window and a second graphical display element that depicts a map of the airport.

The features, functions, and advantages that have been described can be achieved independently in various implementations or may be combined in yet other implementations, further details of which are disclosed with reference to the following description and drawings. The drawings are conceptual and not drawn to scale.

DETAILED DESCRIPTION

Figure 1:
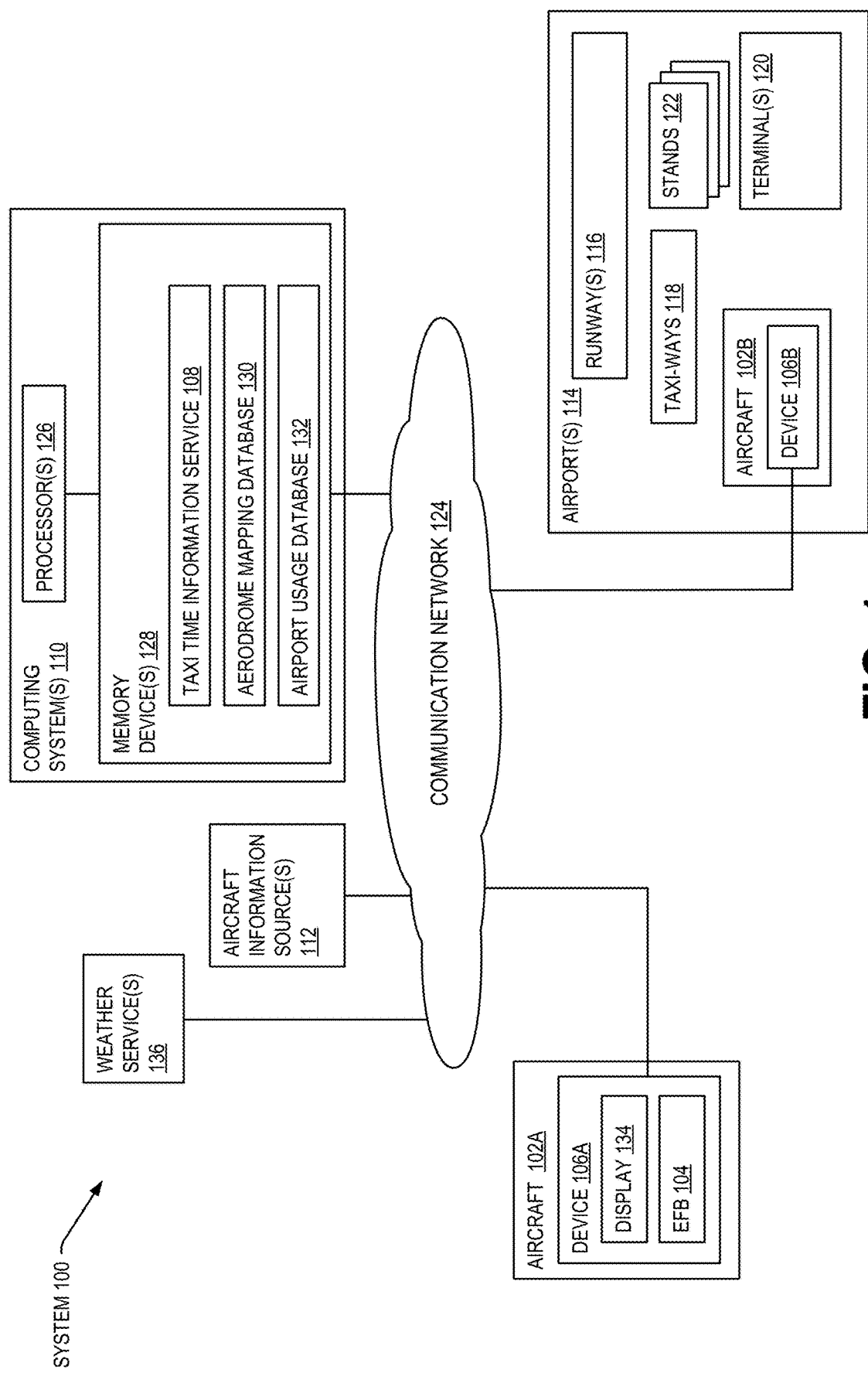
FIG. 1 is a block diagram of a system for providing airport taxi time information to a crew an aircraft.

A crew member of an aircraft is able to request information about taxi times at an airport from a taxi time information service using an electronic flight bag (EFB). The airport is a destination airport for the aircraft, an origin airport for the aircraft, or an airport of interest. The information provided to the EFB in response to the request is dependent on whether the airport is the destination airport, the origin airport, or an airport of interest.

When the airport is the destination airport, the taxi time information service provides information regarding average taxi in times for the airport. When the request does not specify a runway or a stand, the information includes average taxi in times for aircraft that arrived at stands of the airport during a time window up to a present time at the airport. When the request specifies a runway where the aircraft is to land, the information includes average taxi in times for the time window from the runway to any of the stands at the airport for aircraft that arrived at one of the stands during the time window. When the request specifies a stand, the information includes average taxi in times for the time window from any of the runways at the airport to the stand or stands near to the stand for aircraft that arrived at the stand or the stands near to the stand during the time window. When the request specifies a runway and a stand, the information includes average taxi in times for the time window from the runway to the stand or stands near to the stand for aircraft that arrived at the stand or the stands near to the stand during the time window. An estimated time for arrival at a stand is determined by the crew from the average taxi in time and is provided to an airport operations contact so that a ground support team is ready to process the aircraft when the aircraft arrives at the stand. Enabling the ground support team to be ready when the aircraft arrives promotes efficient handling of the aircraft and passenger baggage, which can lead to passenger satisfaction with the flight.

When the airport is the origin airport, the taxi time information service provides information regarding average taxi out times for the airport. When the request does not specify a stand or a runway, the information includes average taxi out times for aircraft that departed from the airport during a time window up to a present time at the airport. When the request specifies a runway, the information includes average taxi out times for aircraft that departed from the airport during a time window up to a present time to the runway from any of the stands at the airport. When the request specifies a stand, the information includes average taxi out times for the time window from the stand or stands near to the stand to any runway of the airport for aircraft that departed from the airport. When the request specifies a runway and a stand, the information includes average taxi out times from the stand or stands near to the stand to the runway for aircraft that departed from the airport via the runway. The crew can use the information to determine an amount of fuel to load for the aircraft, when to start one or more engines of the aircraft, when to request clearance to leave the stand, when to request a de-icing procedure, if necessary, whether to use reduced engine taxiing, to make other determinations, or combinations thereof.

The taxi time information service is also able to provide additional information in response to the request for information for the origin airport. Some multiengine aircraft use a reduced engine taxi technique during taxi to a runway when the taxi out time is long. During a reduced engine taxi technique, only some of the engines (e.g., one or two) are started and the remaining engines remain off during a portion of the taxi out. Prior to the aircraft reaching the runway, the remaining engines are started so that the aircraft is ready to take-off when the aircraft receives clearance. The taxi information service enables the aircraft crew to determine, based on recent taxi times, whether use of the reduced engine taxi technique is viable. Also, the taxi information service provides, or enables the EFB to provide, suggested times for when to start the remaining engines. The additional information includes an estimate of the amount of fuel (e.g., kilograms of fuel) that would not be needed due to reduced engine taxiing based on a predicted taxi out time. In an implementation, fuel saving information is included responsive to particular user input (e.g., activation of a toggle switch on a display, filling a checkbox, etc.).

During winter and for certain weather conditions, an aircraft may need to have a de-icing procedure before take-off. De-icing procedures include removing accumulated frozen water from portions of the aircraft (e.g., the wings). De-icing procedures for weather conditions where ice is likely to form again on the aircraft include placing a coating on portions of the aircraft that will prevent ice formation for a period of time. The coating slides off of the aircraft as the aircraft taxis down the runway during take-off. The coating inhibits ice formation for a period of time, and if the aircraft does not take-off before expiration of the period of time, the de-icing procedure has to be repeated. Some airports that are often subject to icing conditions have fixed location de-icing facilities that the aircraft uses on the taxi out to the runway. For airports that utilize fixed location de-icing facilities, a time for a de-icing procedure is included in the taxi out time for the aircraft.

For airports that do not include fixed location de-icing facilities, a de-icing procedure for an aircraft is requested by the crew and performed at the stand or near to the stand before the aircraft receives clearance to proceed to a runway. Since the de-icing procedure is performed before the aircraft has clearance to proceed to the runway, the time for the de-icing procedure is not included as part of the taxi out time for the aircraft. For crews that utilize EFB s, input entered into the EFB as part of a pre-flight checklist includes a request time for the de-icing procedure and a complete time when the de-icing procedure based on the request is completed. An identifier of the airport, the request time, and the complete time are sent by the EFB to the taxi time information service. The taxi time information service stores the airport identifier, the request time, and the complete time as de-icing data.

When an EFB requests taxi out information for an airport that performs de-icing procedures before an aircraft receives clearance to taxi to a runway, the taxi time information service determines whether weather conditions at the airport are such that a de-icing procedure could be needed. If a de-icing procedure could be needed, information provided to the EFB in response to the request includes a predicted time to request a de-icing procedure based on de-icing data for the airport, a predicted time for clearance from the stand, average taxi out time information based on parameters of the request, or combinations thereof.

When the airport is not the destination airport or the origin airport, the taxi time information service provides information about taxi times at the airport. The information can include average taxi in times, average taxi out times, or both.

One advantage of the above-described implementations is that the crew of an aircraft is made aware of current traffic conditions at the airport. The crew can utilize awareness of the current traffic conditions to efficiently manage engine startup, de-icing requests, stand clearance requests, to determine whether to use reduced engine taxiing, and to expedite handling of the aircraft upon arrival at a stand at a destination airport. Efficient management of engine startup, the use of reduced engine taxiing, or both can save fuel and reduce environmental impact due to use of the aircraft. The crew of the aircraft can inform passengers of estimated times (e.g., time until de-icing, time for stand departure, time for taxi out, time for taxi in, or combinations thereof), which can improve passenger satisfaction with a flight of the aircraft.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features referred to herein as a group or a type are referenced (e.g., when no particular one of the features is being referenced), the reference number is used without a distinguishing letter. However, when one particular feature of multiple features of the same type is referred to herein, the reference number is used with the distinguishing letter. For example, FIG. 1 depicts aircraft 102A and 102B. When referring to a particular one of these aircraft, such as the aircraft 102A, the distinguishing letter "A" is used. However, when referring to any arbitrary one of these aircraft or to aircraft as a group, the reference number 102 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority, order, or arrangement of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a block diagram of a system 100 for providing airport traffic information to a crew of an aircraft 102. The system 100 includes an EFB (electronic flight bag) 104 on a device 106, a taxi time information service 108 on one or more computing systems 110 (e.g., servers), and one or more aircraft information sources 112 to provide aircraft information to the one or more computing systems 110 for airports 114 supported by the system 100. Each airport 114 includes one or more runways 116, one or more taxi-ways 118, one or more terminals 120, and one or more stands 122 for aircraft 102. Aircraft 102 that utilize the system 100 can be located at an airport 114, such as aircraft 102B, or can be at a different location (e.g., in flight), such as aircraft 102A.

In an implementation, the device 106 is a portable device (e.g., a laptop computer or a tablet computer) that is usable in the aircraft 102 or off of the aircraft 102. In another implementation, the device 106 is a component of a computing system of the aircraft 102. The EFB 104 is an electronic information management program that helps an aircraft crew perform flight management tasks. In an implementation, the EFB 104 is FlightDeck Pro (available from Jeppesen; Englewood, Colorado). The device 106 receives input for the EFB 104 that specifies a flight plan for the aircraft 102, including an origin airport and a destination airport for a flight of the aircraft 102. The user of the device 106 provides user input to perform tasks, to request information, or both via the EFB 104.

Requested information can include information about taxi out times at the origin airport in preparation for the flight, a prediction for when to request a de-icing operation when applicable, a prediction of when to request clearance to move from a stand 122, a prediction of when to start engines when using reduced engine taxiing, other information, or combinations thereof. During the flight, the requested information can include information about taxi in times at the destination airport. The crew can use the taxi in information to estimate when the aircraft 102 will arrive at a stand 122 assigned to the aircraft 102. The crew can provide the estimate to an airport support personnel contact so that airport support personnel are ready to process the aircraft 102 when the aircraft 102 arrives at the stand 122. The requested information can also include taxi information for an airport 114 other than the origin airport or the destination airport (e.g., an alternate airport included in the flight plan or an airport near a flight path of the aircraft 102).

The one or more computing systems 110 include one or more servers or other types of computing systems communicatively coupled to the devices 106 via a communication network 124. The one or more computing systems 110 receive requests from requesting devices authorized to access the taxi time information service 108 (e.g., the devices 106) for information associated with taxi times at airports 114. In an implementation, a user of the device 106 enters a username and a password, or other user identification information, to access functionality of the device 106, the EFB 104, or both, and the EFB 104 provides authentication information to the one or more computing systems 110 with the requests to access functionality of the taxi time information service 108.

The one or more computing systems 110 process the requests using the taxi time information service 108 and send results back to the requesting devices. The results are based on data received from the one or more aircraft information sources 112. The one or more aircraft information sources 112 provide aircraft data associated with aircraft 102 to the one or more computing systems 110. The aircraft data can include automatic dependent surveillance-broadcast (ADS-B) data from an ADS-B data source (e.g., FlightAware, Houston, Texas; Flightradar24 AB, Stockholm, Sweden, etc.) aircraft communications addressing and reporting system (ACARS) data, airport surface detecting equipment (ASDE-X) data, other aircraft tracking data, or combinations thereof. The aircraft data includes identifiers of aircraft 102, types of the aircraft 102, locations of the aircraft 102, speeds of the aircraft 102, other information, or combinations thereof.

The one or more computing systems 110 include one or more processors 126 and one or more memory devices 128. The one or more memory devices 128 include instructions executable by the one or more processors 126 to perform operations, including the operations of the taxi time information service 108. The one or more memory devices 128 include, or has access to, an aerodrome mapping database 130 and includes an airport usage database 132.

The taxi time information service 108 provides, in response to a request received from a device 106, data from the aerodrome mapping database 130 to the device 106 that enables the device to send to a display 134 of the device 106 a map of features of an airport 114 identified in the request. The features include the runways 116, taxi-ways 118, terminals 120, stands 122, and other features of the airport 114. When the aircraft 102 is located at the airport 114 or near to the airport 114, a location of the aircraft 102 associated with the device 106 is indicated by an icon (e.g., a triangular shape) on the map, and the map is updated to track movement of the aircraft 102 when the aircraft 102 is in motion or to perform changes based on user input (e.g., panning in one or more selected directions, zooming in, zooming out, etc.).

The map displays a route assigned to the aircraft 102 for taxi in or taxi out. The map emphasizes the current location of the aircraft with an icon (e.g., the triangular shaped icon), where the aircraft 102 already has been in a first color (e.g., dark magenta), and where the aircraft 102 is to go in a second color (e.g., light magenta). In response to certain requests from the device 106, the display presents taxi time information and shows selectable indicators for aircraft 102 that recently taxied at the airport. When a particular selectable indicator is selected, the map display emphasizes the particular taxi-ways used by the corresponding aircraft in a particular color (e.g., blue).

In an implementation, and depending on the content of the request, the map is able to emphasize congestion areas at the airport by displaying portions of taxi-ways 118 where one or more aircraft 102 stopped during a survey time frame for longer than a stop threshold time in a first color (e.g., red), displaying portions of taxi-ways where one or more aircraft stopped during the survey time frame for less than the stop threshold of time or traveled below a threshold speed during the survey time frame in a second color (e.g., amber), displaying remaining portions of usable taxi-ways in a third color (e.g., green), displaying out of service taxi-ways in a fourth color (e.g., gray), displaying other conditions of taxi-ways or features (e.g., de-icing stations) in other colors, or combinations thereof.

The one or more computing system 110 receives aircraft data for aircraft 102 from the one or more aircraft information sources 112. The taxi time information service 108 analyzes the aircraft data and adds entries to, or modifies entries in, the airport usage database 132 based on portions of the aircraft data.

For each aircraft 102 identified in the aircraft data, the one or more computing systems 110 determines a location of the aircraft 102. The aircraft data for the aircraft 102 is ignored if the location of the aircraft 102 does not correspond to an airport 114 identified in the aerodrome mapping database 130. The data for the aircraft 102 is also ignored if the speed of the aircraft is above a threshold speed, which indicates that the aircraft 102 is in flight.

When the aircraft 102 lands at the airport 114, the aircraft data, the aerodrome mapping database 130, or both, are used to add entries in the airport usage database 132 for the aircraft 102. The entries include an identifier of the aircraft 102, an identifier of the airport 114, an identifier of a runway 116 where the aircraft 102 landed, a landing time when the aircraft reached the threshold speed, current location of the aircraft 102, current speed of the aircraft 102, identifiers of one or more taxi-ways 118 used by the aircraft 102, an arrival time when the aircraft 102 parks at a stand 122, an identifier of the stand 122, other information (e.g., weather conditions), or combinations thereof. The time difference from the landing time to the arrival time at the stand 122 is the taxi in time for the aircraft 102.

For an aircraft at a stand 122, the aircraft data, the aerodrome mapping database 130, or both, are used to update entries in the airport usage database 132 based on the aircraft identifier when the aircraft 102 moves away from the stand 122. The entries include a stand departure time when the aircraft 102 moves away from the stand 122 (e.g., pullback), current location of the aircraft 102, current speed of the aircraft 102, identifiers of taxi-ways 118 used to travel to a runway 116, a departure time when the aircraft 102 reaches the threshold speed on the runway 116, an identifier of the runway 116 used by the aircraft 102 when the aircraft reached the threshold speed, other information (e.g., weather conditions), or combinations thereof. In an implementation, the entries for the current location, the current speed, or both, are set to null values after the speed of the aircraft 102 reaches the threshold speed to indicate that the aircraft 102 is no longer at the airport. The time difference from the departure time to the stand departure time is the taxi out time for the aircraft 102.

A computing system 110 receives requests for taxi time information from one or more devices 106. A request from a device 106 specifies an airport 114 and what information should be provided to the device 106 about the airport 114. The request can be a request for map information for the airport 114 (e.g., a map of features of the airport 114, a congestion map indicating aircraft traffic at the airport 114, etc.), a general request for taxi time information associated with the airport 114; a request for taxi in time information associated with the airport 114, a runway 116, a stand 122, or combinations thereof; a request for taxi out time information associated with the airport 114, a runway 116, a stand 122, or combinations thereof; a request for other information; or combinations thereof.

In some implementations, the request specifies a time window for information of interest to the user of the device 106, and the taxi time information service 108 returns results for the time window. In an implementation, the time window extends from the present time to a particular time in the past. The particular time can be an hour, two hours, the current day, a day (e.g., 24 hours), a week, a month, or some other selected amount of time. In an implementation, the time window extends from a first time in the past to a second time in the past. For example, the time window is the month of February when the current month is March. In other implementations, the request does not specify a time window, and the taxi time information service returns results for a default time window. The default time for the default time window is a balance of recency of data and having enough data to provide useful information. In a particular implementation, the default time window is two hours, but other default times (e.g., 1 hour, 1.5 hours, 2.5 hours, or some other time) are used for particular situations, particular airports, or both.

When the request is a request for taxi in time information, or both taxi in time information and taxi out time information, the one or more processors 126 determine a first set of aircraft 102 in the airport usage database 132 that landed at an airport 114 specified in the request and taxied to a stand 122 during the time window, where the first set of aircraft satisfy a runway limitation, a stand limitation, or both when the request specifies a particular runway, a particular stand, or both. The taxi in information includes an average taxi in time for the aircraft 102 included in the first set. In implementations, the taxi in information includes average taxi in times, minimum taxi in time, and maximum taxi in time for segments of the time window to enable the device 106 to display a graphical representation of taxi in information. For example, if the time window is two hours, the taxi in information includes average taxi in times, minimum time in, and maximum time in determined for 20 minute increments based on aircraft arrivals at stands 122 for the time window.

Figure 6:
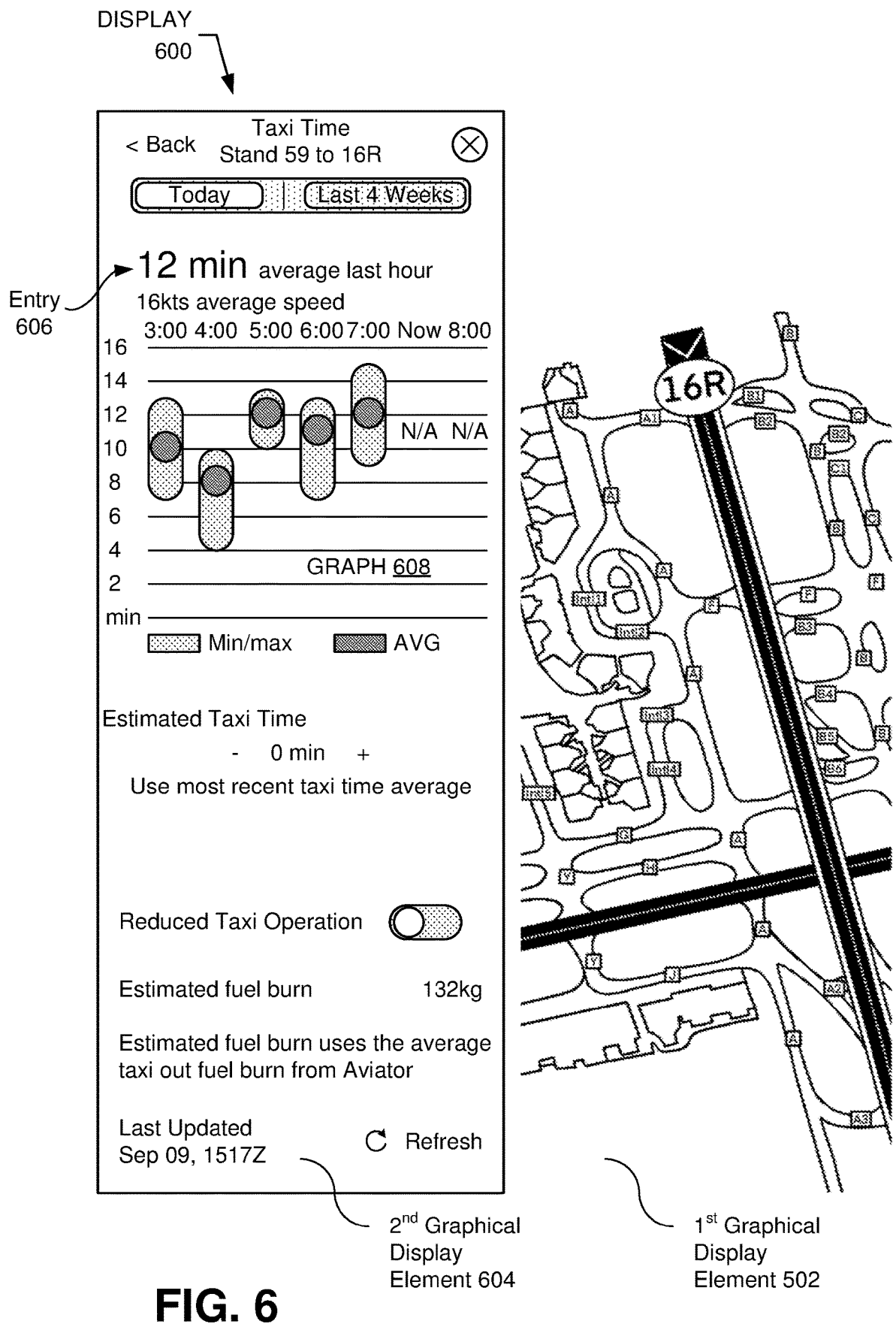
FIG. 6 is a portion of a fifth display that presents airport taxi time information.

When the request is a request for taxi out time information, or both taxi out time information and taxi in time information, the one or more processors determine a second set of aircraft 102 in the airport usage database that left a stand 122 at an airport 114 identified in the request, taxied to a runway 116, and departed the airport 114, where the second set of aircraft 102 satisfy a runway limitation, a stand limitation, or both when the request specifies a particular runway, a particular stand, or both. The taxi out information includes an average taxi out time for the aircraft included in the second set. In implementations, the taxi out information includes average taxi out times, minimum time out times, and maximum taxi out times for segments of the time window to enable the device 106 to display a graphical representation of taxi out information. For example, if the time window is set to the present day, the taxi in information includes average taxi out times, minimum taxi out times, and maximum taxi out times determined for 1 hour intervals of the present day for departures from the airport during the time window. FIG. 6 depicts taxi out time information with a graphic representation of taxi out information for aircraft that initiated departure from stand 59, or a stand near to stand 59, and departed on runway 16R at a particular airport.

Depending on the contents of the request, results returned to the device that made the request can include additional information. The additional information includes estimated time when a de-icing request should be made when weather conditions indicate that de-icing could be needed, estimated departure time from a stand, estimated fuel savings by use of reduced engine taxiing, estimated time to start engines when using reduced engine taxiing, taxi-way usage and taxi times associated with departed aircraft, other information, or combinations thereof.

When the request from a device 106 is for taxi out information at an airport 114 and when the airport 114 does not utilize de-icing procedures performed at de-icing stations located between stands 122 and the runways 116 of the airport 114, the taxi time information service 108 accesses weather information for the airport 114 from a one or more weather services 136. The weather information includes recent weather conditions, current weather conditions, and a weather forecast. The taxi time information service applies one or more rules to the weather information and provides predicted times for requests for de-icing procedures to the device 106 if icing conditions could be present at the airport 114.

During use of the EFB 104, a user of the device 106 inputs data requesting taxi time information at an airport 114, airport map information, or both. The EFB 104 causes the device 106 to send a request based on input data to the taxi time information service 108 of a computing system 110. In response to the request for taxi time information, the device 106 receives taxi time information from the computing system 110 that enables the EFB 104 to display taxi time information to the display 134 of the device 106, a map of the airport 114, or both, via one or more graphical display elements.

Figure 2:
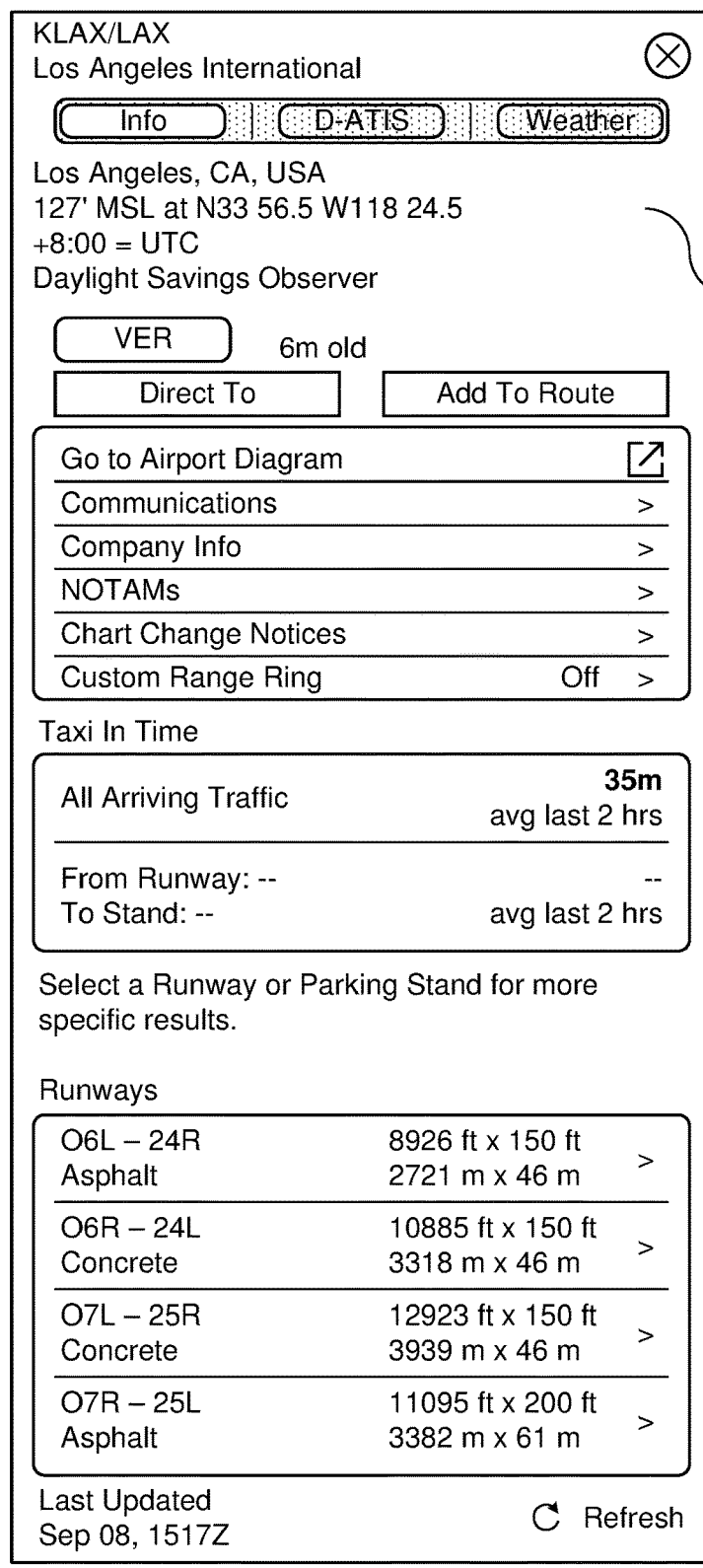
FIG. 2 is a portion of a first display that presents airport taxi time information.
Figure 3:
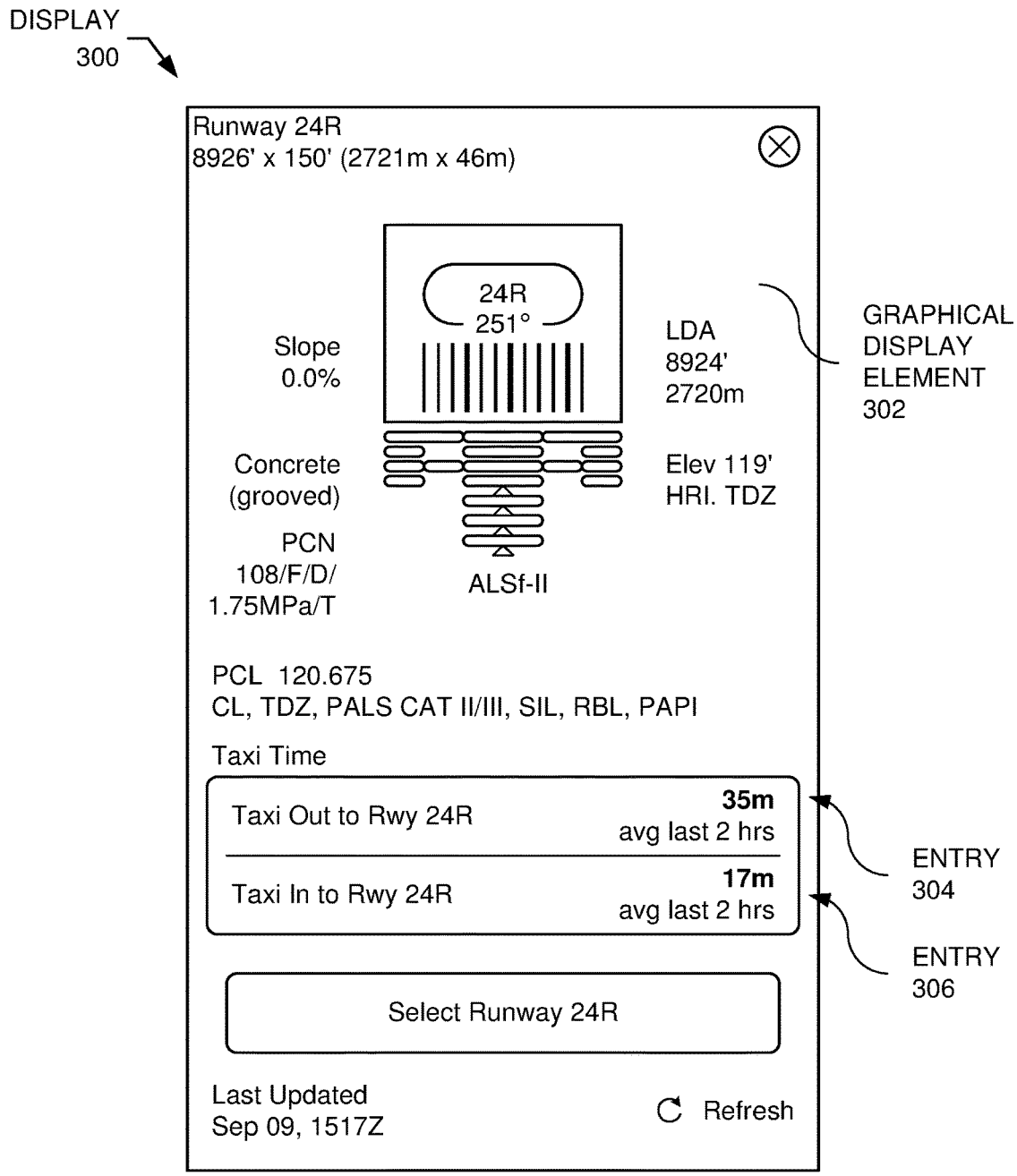
FIG. 3 is a portion of a second display that presents airport taxi time information.

FIGS. 2 and 3 depict representations of portions of a display 134 of device 106 generated by the EFB 104 from information received from the computing system 110 in response to requests sent from the device 106. FIG. 2 shows a portion of a display 200 responsive to a request for general information associated with a particular airport. The portion of the display 200 includes a graphical display element 202. The graphical display element 202 includes an entry 204 that shows a taxi in time for all arriving traffic at the airport. FIG. 3 shows portion of a display 300 for a particular runway at an airport based on information received in response to a request sent to the computing system 110. The portion of the display 300 includes a graphical display element 302. The graphical display element 302 includes an entry 304 for average taxi out times to the particular runway and an entry 306 for average taxi in times from the particular runway.

Figure 4:
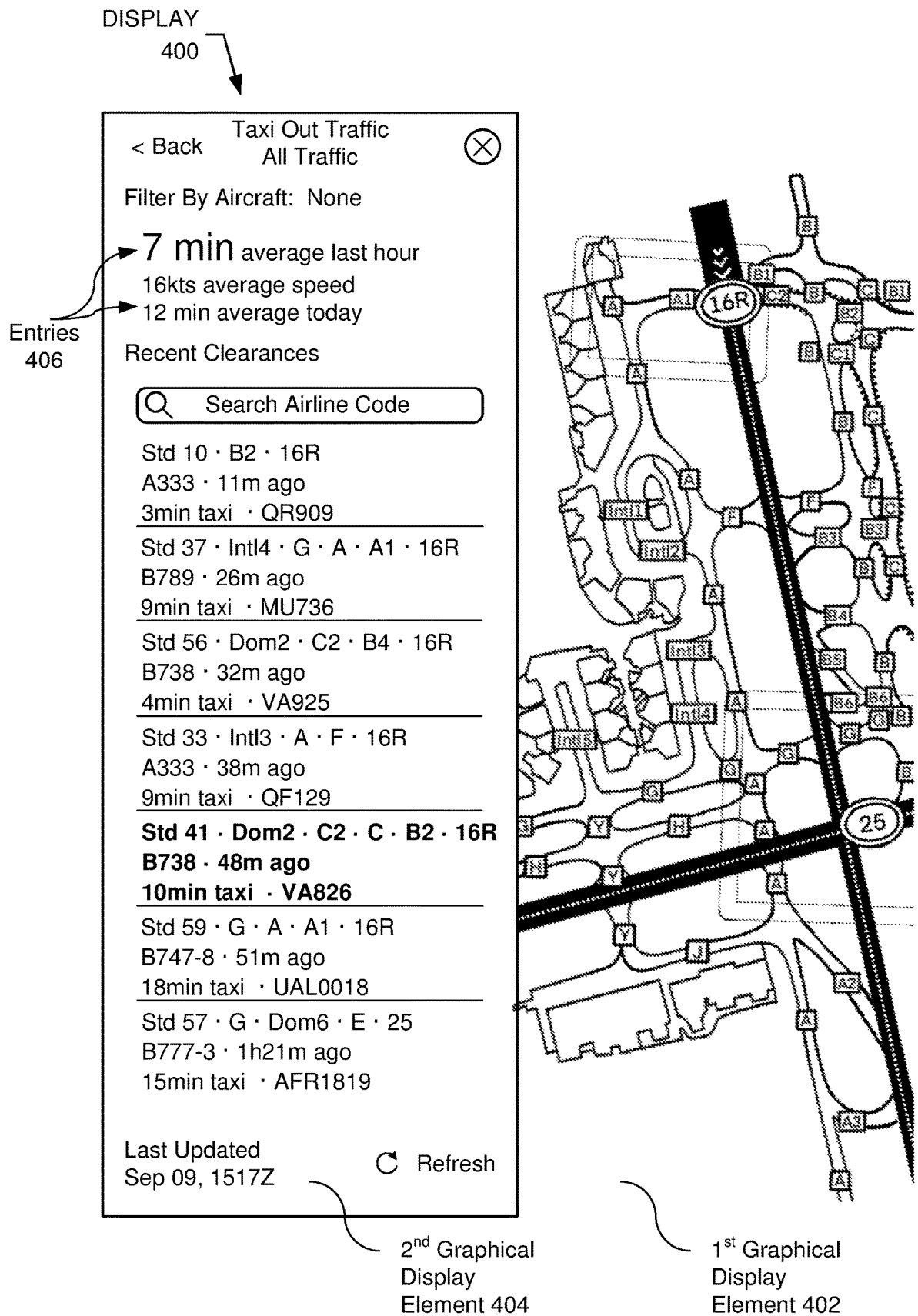
FIG. 4 is a portion of a third display that presents airport taxi time information.
Figure 5:
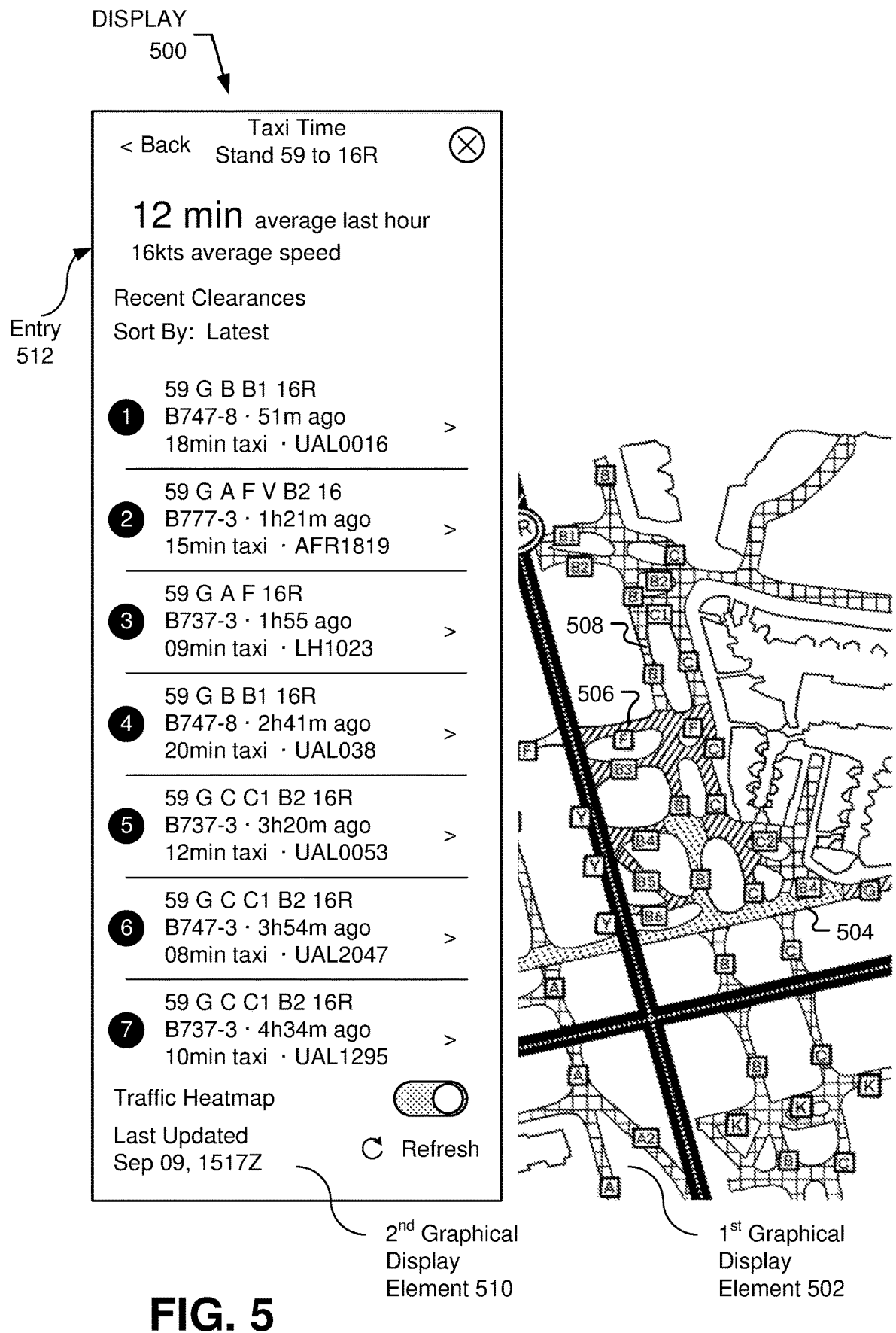
FIG. 5 is a portion of a fourth display that presents airport taxi time information.

FIG. 4-6 depict representations of portions of displays including airport maps generated by the EFB in response to requests sent from the device 106. FIG. 4 shows a portion of a display 400 responsive to a request for taxi out information at a particular airport. The portion of the display 400 includes a first graphical display element 402 that displays a map of the particular airport including identifiers of utilized runways (e.g., runway 16R and runway 25) of the particular airport. The portion of the display also includes a second graphical element 404 that overlays a portion of the first graphical element 402 and presents taxi out information. The second graphical display element 404 includes entries 406 for average taxi out times and presents information associated with recent clearances for the particular airport.

FIG. 5 shows a portion of a display 500 responsive to a request for taxi out information associated with a particular airport from stand 59, or stands near to stand 59, to runway 16R. The portion of the display 500 includes a first graphical display element 502 that displays a representation of a portion of the particular airport that shows congestion areas associated with runway 16R. Areas of high congestion 504 (e.g., where one or more aircraft 102 stopped during a survey time frame for longer than a stop threshold time) are depicted in a first color. Areas of medium congestion 506 (e.g., where one or more aircraft stopped during the survey time frame for less than the stop threshold of time or traveled below a threshold speed during the survey time frame) are depicted in a second color. Areas of low or no congestion 508 are depicted in a third color.

The portion of the display 500 also includes a second graphical display element 510 that overlays a portion of the first graphical element 502 and presents taxi out information to runway 16R. The second graphical element 510 includes an entry 512 for average taxi out times and presents information associated with recent clearances for runway 16R.

FIG. 6 shows a portion of a display 600 responsive to a request for taxi out information associated with a particular airport from stand 59, or stands near to stand 59, to runway 16R. The portion of the display 600 includes a first graphical display element 602 that displays a representation of a portion of the particular airport including runway 16R. The portion of the display 600 also includes a second graphical display element 604 that overlays a portion of the first graphical element 602 and presents taxi out information to runway 16R. The second graphical element 604 includes entry 606 that displays an average taxi out time and a graph 608 that displays average taxi out time information for a number of hours of a present day.

Figure 7:
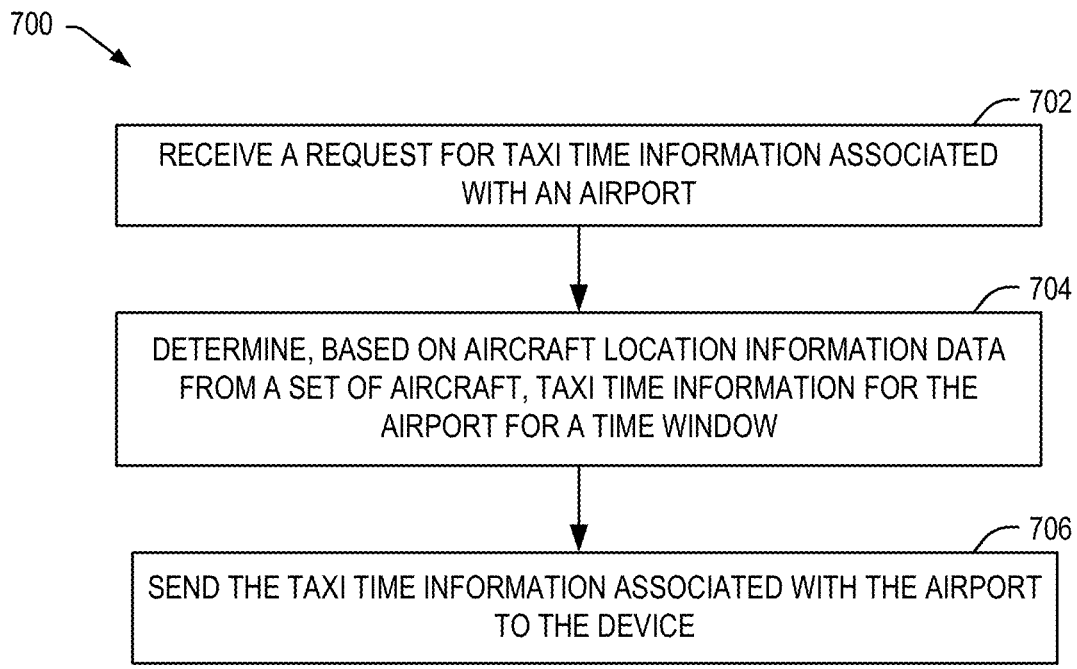
FIG. 7 is a flowchart of a first method of providing airport taxi time information to a crew of an aircraft.

FIG. 7 is a flow chart of a method 700 of providing taxi time information to a crew of an aircraft 102. The method 700 is performed by the computing system 110 of FIG. 1. The method 700, at block 702, includes receiving a request for taxi time information from a device. The request specifies an airport and particular information to be provided in response to the request. The particular information includes a map of a portion of the airport, taxi in information for the airport, taxi out information for the airport, or combinations thereof. Some requests specify a runway of the airport, a stand at the airport, or both. Other requests do not specify a runway at the airport or a stand at the airport.

The method 700, at block 704, includes determining based on aircraft location information data from a set of aircraft, taxi information for the airport for a time window.

The aircraft location data includes ADS-B data for aircraft 102, other location data for aircraft, or both.

The taxi time information includes average taxi time for the set of aircraft during the time window. In some implementations, the taxi time information includes average taxi times, minimum taxi times, and maximum taxi times for increments of the time window for the set of aircraft. The taxi information includes taxi in time information, taxi out time information, or both.

The method 700, at block 706, also includes sending the taxi time information associated with the airport to the device 106. The device 106 is configured to present the taxi time information to a display 134 of the device 106.

The computing system 110 is able to process requests received from multiple devices 106. For example, the computing system 110 receives a first request for taxi in information from the first device 106A, determines first taxi information based on the content of the first request, and sends the first taxi information to the first device 106A. At the same time or at a different time, the computing system 110 receives a second request for taxi out information from the second device 106B, determines second taxi information based on the content of the second request, and sends the second taxi information to the second device 106B.

Figure 8:
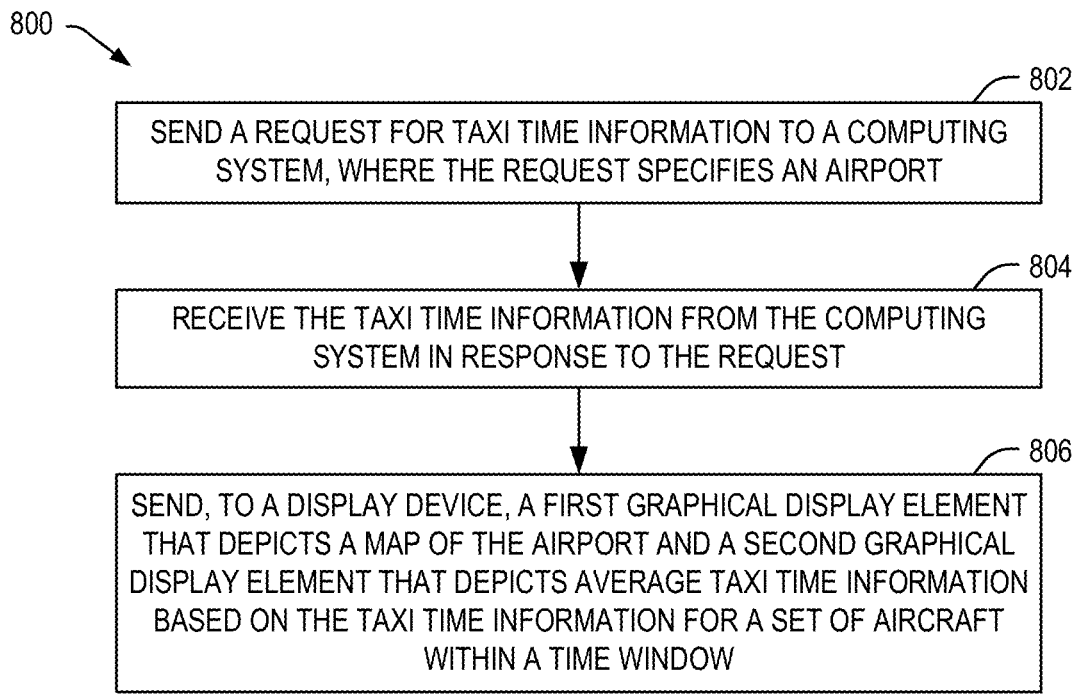
FIG. 8 is a flowchart of a second method of providing airport taxi time information to a crew of an aircraft.

FIG. 8 is a flow chart of a method 800 of providing taxi time information to a crew of an aircraft 102. The method 800 is performed by the device 106 of FIG. 1. The method 800, at block 802, includes sending a request for taxi time information from the device 106 to a computing system 110. The request is based on user input received by the device 106. The request specifies an airport 114 and particular information to be provided in response to the request. Some requests specify a time window for the taxi time information. For requests that do not specify a time window, the computing system 110 uses a default time window. Some requests specify a runway of the airport, a stand at the airport, or both. Other requests do not specify a runway at the airport or a stand at the airport.

The method 800, at block 804, includes receiving the taxi time information from the computing system in response to the request. The taxi time information includes a map of a portion of the airport, taxi in information for the airport, taxi out information for the airport, or combinations thereof depending on content of the request.

The method 800, at block 806, also includes sending, to a display device, a first graphical display element that depicts a map of the airport, a second graphical display element that depicts average taxi time information based on the taxi time information for a set of aircraft that taxied at the airport during a time window. For taxi in information, the set of aircraft include aircraft that arrived at a stand of the airport during the time window. For taxi out information, the set of aircraft include aircraft that departed from a runway of the airport during the time window.

Some requests sent to the computing system 110 from devices 106 ask for congestion information for the airport 114, and the taxi time information received by the devices 106 from the computing system 110 include congestion information. A device that receives congestion information indicates first portions of taxi-ways of the first graphical display element in a first color based on the congestion information. The first portions of the taxi-ways represent congested taxi-ways where one or more aircraft stopped for longer than a stop threshold during a survey time frame. In an implementation, the first color is red. The device indicates second portions of taxi-ways of the first graphical display element in a second color distinct from the first color based on the congestion information. The second portions of taxi-ways represent reduced speed taxi-ways where one or more aircraft stopped during the survey time frame for a time less than the stop threshold or traveled below a threshold speed during the survey time frame. In an implementation, the second color is amber. The device 106 indicates third portions of taxi-ways where aircraft travel is not limited during the survey time frame in a third color distinct from the first color and the second color. In an implementation, the third color is green.

Figure 9:
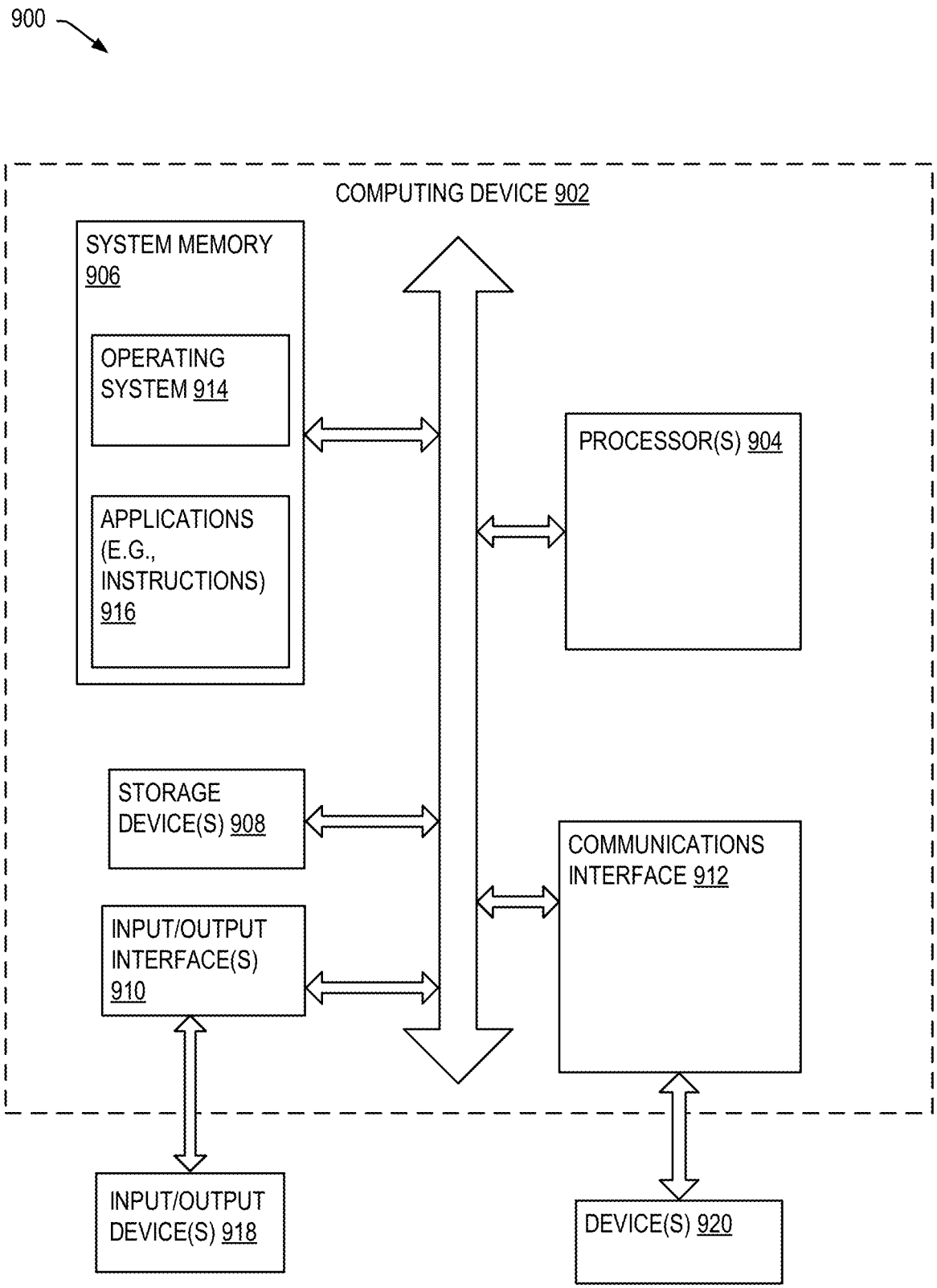
FIG. 9 is a diagram of a representation of a computing system.

FIG. 9 is an illustration of a block diagram of a computing environment 900 including a general purpose computing device 902 configured to support implementations of computer-implemented methods and computer-executable program instructions (or code) according to the present disclosure. For example, the computing device 902, or portions thereof, may execute instructions to perform, or cause equipment to perform, operations described with reference to FIGS. 1-8. In an implementation, the computing device 902 is, or is a component of, the aircraft 102, the device 106, the computing system 110, the aircraft information source 112, the communication network 124, the weather service 136, or combinations thereof.

The computing device 902 includes a processor 904. In an implementation, the processor 904 includes the one or more processors 126 of FIG. 1. In another implementation the processor 904 is a processor of the device 106. The processor 904 communicates with a system memory 906, one or more storage devices 908, one or more input/output interfaces 910, one or more communications interfaces 912, or a combination thereof. The system memory 906 includes non-transitory computer readable media, including volatile memory devices (e.g., random access memory (RAM) devices), nonvolatile memory devices (e.g., read-only memory (ROM) devices, programmable read-only memory, and flash memory), or both. The system memory 906 includes an operating system 914, which may include a basic input/output system for booting the computing device 902 as well as a full operating system to enable the computing device 902 to interact with users, other programs, and other devices. The system memory 906 includes one or more applications 916 (e.g., instructions) which are executable by the processor 904. In an implementation, the system memory 906 and the one or more storage devices 908 include the memory devices 128 of FIG. 1, and the one or more applications 916 include the taxi time information service 108 of FIG. 1. In another implementation, the system memory 906 and the one or more storage devices 908 include memory devices of the device 106 of FIG. 1, and the one or more applications include the EFB 104 of FIG. 1.

The processor 904 communicates with the one or more storage devices 908. For example, the one or more storage devices 908 are non-transitory computer readable media that can include nonvolatile storage devices, such as magnetic disks, optical disks, or flash memory devices. The storage devices 908 can include both removable and non-removable memory devices. The storage devices 908 can be configured to store an operating system, images of operating systems, applications, and program data. In particular implementations, the system memory 906, the storage devices 908, or both, include tangible computer-readable media incorporated in hardware and which are not signals.

The processor 904 communicates with the one or more input/output interfaces 910 that enable the computing device 902 to communicate with one or more input/output devices 918 to facilitate user interaction. The input/output interfaces 910 can include serial interfaces (e.g., universal serial bus (USB) interfaces or Institute of Electrical and Electronics Engineers (IEEE) 1364 interfaces), parallel interfaces, display adapters, audio adapters, and other interfaces. The input/output devices 918 can include keyboards, pointing devices, displays, speakers, microphones, touch screens, and other devices. The processor 904 detects interaction events based on user input received via the input/output interfaces 910. Additionally, the processor 904 sends a display to a display device via the input/output interfaces 910. In some implementations, the input/output devices 918 include the display 134 of the device 106 of FIG. 1.

The processor 904 can communicate with one or more devices 920 via the one or more communications interfaces 912. The one or more devices 920 can include external computing devices contacted via the communication network 124 and controllers, sensors, and other devices coupled to the computing device 902 via wired or wireless local connections. The one or more communications interfaces 912 may include wired Ethernet interfaces, IEEE 802 wireless interfaces, other wireless communication interfaces, one or more converters to convert analog signals to digital signals, electrical signals to optical signals, one or more converters to convert received optical signals to electrical signals, or other network interfaces.

Aspects of the disclosure are described further with reference to the following set of interrelated clauses:

According to Clause 1, a method of providing taxi time information for an airport includes: receiving, at a computing system from a device, a request for taxi time information associated with an airport; determining, at the computing system based on aircraft location information data from a set of aircraft, taxi time information for the airport for a time window, wherein the set of aircraft include aircraft that taxied at the airport within the time window and wherein the time window is less than or equal to one day; and sending the taxi time information associated with the airport from the computing system to the device.

Clause 2 includes the method of Clause 1, wherein the aircraft location information data comprises automatic dependent surveillance broadcast data.

Clause 3 includes the method of Clause 1 or Clause 2, wherein the taxi time information comprises average taxi time for the set of aircraft during the time window; and average taxi times, minimum taxi times, and maximum taxi times for incremental portions of the time window for the set of aircraft.

Clause 4 includes the method of any of Clauses 1 to 3, wherein the taxi time information comprises congestion information associated with taxi-ways used by the set of aircraft.

Clause 5 includes the method of any of Clauses 1 to 4, wherein the taxi time information comprises taxi out time information for the set of aircraft.

Clause 6 includes the method of Clause 5, wherein the request specifies a stand, and wherein the set of aircraft include aircraft that started taxi out from the stand during the time window and aircraft that started taxi out from another stand near to the stand during the time window.

Clause 7 includes the method of Clause 5, wherein the request specifies a runway, and wherein the set of aircraft include aircraft that departed via the runway during the time window.

Clause 8 includes the method of any of clauses 1 to 8, wherein the taxi time information comprises taxi in time information for the set of aircraft.

Clause 9 includes the method of Clause 8, wherein the request specifies a runway, and wherein the set of aircraft include aircraft that landed on the runway during the time window.

Clause 10 includes the method of Clause 8, wherein the request specifies a stand, and wherein the set of aircraft include aircraft that ended taxi in at the stand during the time window and aircraft that ended taxi at a stand near the stand during the time window.

According to Clause 11, a method of providing taxi time information for an airport includes: receiving, at a computing system from a first device, a first request for taxi out time information associated with a first airport; determining, at the computing system based on first aircraft location information data from a first set of aircraft that departed from the first airport within a first time window, taxi out time information for the first airport; and sending the taxi out time information to the first device responsive to the first request.

Clause 12 includes the method of Clause 11, and further includes receiving, at the computing system from a second device, a second request for taxi in time information associated with a second airport; determining, at the computing system based on second automatic dependent surveillance broadcast data from a second set of aircraft that arrived at the second airport within a second time window, taxi in time information for the second airport; and sending the taxi in time information to the second device responsive to the second request.

Clause 13 includes the method of Clause 11 or Clause 12, wherein the first time window is a default time range not specified in the first request.

Clause 14 includes the method of any of Clauses 11 to 13, wherein the taxi out information comprises average taxi out time for the first set of aircraft during the first time window, a maximum taxi out time for the first set of aircraft during the first time window, a minimum taxi out time for the first set of aircraft during the first time window, or combinations thereof.

Clause 15 includes the method of any of Clauses 11 to 14, wherein the first request specifies a stand and a runway, and wherein the taxi out information comprises an average taxi out time for aircraft departing the airport from the runway for aircraft that started taxi out from the stand, from one or more stands near the stand, or both, during the first time window.

According to Clause 16, a computer-readable storage device includes instructions, wherein the instructions are executable by one or more processors to: send a request for taxi time information to a computing system, wherein the request specifies an airport; receive the taxi time information for the airport from the computing system in response to the request; and send, to a display device, a first graphical display element that depicts a map of the airport, a second graphical display element that depicts average taxi time information based on the taxi time information for a set of aircraft that taxied at the airport during a time window, or both.

Clause 17 includes the computer-readable storage device of Clause 16, wherein the request asks for congestion information for the airport, and wherein the taxi time information includes data congestion information, and wherein the instructions are further executable by the one or more processors to: indicate areas of high congestion of taxi-ways of the first graphical display element in a first color based on the congestion information, wherein the areas of high congestion represent congested taxi-ways where one or more aircraft stopped for longer than a stop threshold during a survey time frame; and indicate areas of medium congestion of the taxi-ways in a second color based on the congestion information, wherein the areas of medium congestion represent reduced speed taxi-ways where one or more aircraft stopped during the survey time frame for a time less than the stop threshold or traveled below a threshold speed during the survey time frame.

Clause 18 includes the computer-readable storage device of Clause 16 or Clause 17, wherein the taxi time information comprises taxi out information for the set of aircraft, and wherein aircraft in the set of aircraft departed from a runway of the airport during the time window.

Clause 19 includes the computer-readable storage device of any of Clauses 16 to 18, wherein the taxi time information comprises taxi in information for the set of aircraft, and wherein aircraft in the set of aircraft arrived at a stand of the airport during the time window.

Clause 20 includes the computer-readable storage device of Clause 19, wherein the request specifies the time window.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of providing taxi time information for an airport, the method comprising:
   receiving, at a computing system from a device, a request for taxi time information associated with the airport;
   determining, at the computing system based on aircraft location information data from a set of aircraft, taxi time information for the airport for a time window, wherein:
      the set of aircraft include aircraft that taxied at the airport within the time window, the time window extends from a present time to a particular past time that is less than or equal to one day, and
      the taxi time information includes, for each of a plurality of incremental time segments within the time window:
         an average taxi time for aircraft that completed taxiing during the time segment,
         a minimum taxi time for aircraft that completed taxiing during the time segment, and
         a maximum taxi time for aircraft that completed taxiing during the time segment; and
   generating a graphical representation that visually depicts variations in the average, minimum, and maximum taxi times across the plurality of incremental time segments;
   identifying congestion patterns based on comparing the taxi time information across multiple consecutive incremental time segments;
   adjusting, based on the identified congestion patterns to reduce congestion at the airport
      at the computing system, at least one of:
         an aircraft departure time,
         a runway assignment,
         a taxiway allocation, or
         a ground crew resource distribution; and
      in response to the request, sending the taxi time information, the graphical representation, and the adjustment to the device.

2. The method of claim 1, wherein the aircraft location information data comprises automatic dependent surveillance broadcast data.

3. The method of claim 1, wherein determining the taxi time information comprises:
   obtaining taxiway usage data for the airport;
   determining taxiway intersection points with active taxi routes; and
   adjusting the taxi time information for the incremental time segments based on traffic density at the taxiway intersection points.

4. The method of claim 1, wherein the taxi time information further comprises congestion information associated with taxi-ways used by the set of aircraft, wherein the identified congestion patterns include temporal patterns of congestion at specific taxi-ways.

5. The method of claim 1, wherein the taxi time information further comprises additional taxi out time information for the set of aircraft.

6. The method of claim 5, wherein the request specifies a stand, and wherein the set of aircraft include aircraft that started taxi out from the stand during the time window and aircraft that started taxi out from another stand near to the stand during the time window.

7. The method of claim 5, wherein the request specifies a runway, and wherein the set of aircraft include aircraft that departed via the runway during the time window.

8. The method of claim 1, wherein the taxi time information further comprises taxi in time information for the set of aircraft.

9. The method of claim 8, wherein the request specifies a runway, and wherein the set of aircraft include aircraft that landed on the runway during the time window.

10. The method of claim 8, wherein the request specifies a stand, and wherein the set of aircraft include aircraft that ended taxi in at the stand during the time window and aircraft that ended taxi at a stand near the stand during the time window.

11. The method of claim 1, wherein determining the taxi time information comprises:
   identifying active runways at the airport;
   determining available taxi routes for the active runways; and
   calculating separate taxi time information for each available taxi route, wherein the identified congestion patterns include route-specific congestion information for each available taxi route.

12. The method of claim 1, further comprising:
   receiving an indication of a de-icing procedure location for an aircraft;
   including a de-icing time in the taxi time information for fixed location facility de-icing procedures; and
   excluding de-icing time from the taxi time information for stand-based de-icing procedures.

13. A non-transitory computer-readable medium storing instructions that, when executed by one or more processors, cause the one or more processors to:
   receive, from a first device, a request for taxi time information associated with an airport;
   determine, based on aircraft location information data from a set of aircraft, taxi time information for the airport for a time window, wherein:

the set of aircraft include aircraft that taxied at the airport within the time window, the time window extends from a present time to a particular past time that is less than or equal to one day, the taxi time information includes, for each of a plurality of incremental time segments within the time window:

an average taxi time for aircraft that completed taxiing during the time segment, a minimum taxi time for aircraft that completed taxiing during the time segment, and a maximum taxi time for aircraft that completed taxiing during the time segment; and generate a graphical representation that visually depicts variations in the average, minimum, and maximum taxi times across the plurality of incremental time segments;

identify congestion patterns based on comparing the taxi time information across multiple consecutive incremental time segments;

adjust, based on the identified congestion patterns to reduce congestion at the airport, at least one of:

an aircraft departure time, a runway assignment, a taxiway allocation, or a ground crew resource distribution; and in response to the request, send the taxi time information, the graphical representation and the adjustment to the device.

14. The non-transitory computer-readable medium of claim 13, wherein the aircraft location information data comprises automatic dependent surveillance broadcast data.

15. The non-transitory computer-readable medium of claim 13, wherein the taxi time information comprises congestion information associated with taxi-ways used by the set of aircraft, wherein the identified congestion patterns include temporal patterns of congestion at specific taxiways.

16. The non-transitory computer-readable medium of claim 13, wherein the taxi time information further comprises taxi out time information for the set of aircraft.

17. A device comprising:

a memory configured to store instructions; and one or more processors configured to execute the instructions to:

receive, from a first device, a request for taxi time information associated with an airport;

determine based on aircraft location information data from a set of aircraft, taxi time information for the airport for a time window, wherein:

the set of aircraft include aircraft that taxied at the airport within the time window, the time window extends from a present time to a particular past time that is less than or equal to one day, and the taxi time information includes, for each of a plurality of incremental time segments within the time window:

an average taxi time for aircraft that completed taxiing during the time segment, a minimum taxi time for aircraft that completed taxiing during the time segment, and a maximum taxi time for aircraft that completed taxiing during the time segment; and generate a graphical representation that visually depicts variations in the average, minimum, and maximum taxi times across the plurality of incremental time segments;

identify congestion patterns based on comparing the taxi time information across multiple consecutive incremental time segments;

adjust, based on the identified congestion patterns to reduce congestion at the airport, at least one of:

an aircraft departure time, a runway assignment, a taxiway allocation, or a ground crew resource distribution; and in response to the request, send the taxi time information, the graphical representation, and the adjustment to the device.

18. The device of claim 17, wherein the aircraft location information data comprises automatic dependent surveillance broadcast data.

19. The device of claim 17, wherein the taxi time information further comprises congestion information associated with taxi-ways used by the set of aircraft, wherein the identified congestion patterns include temporal patterns of congestion at specific taxi-ways.

20. The device of claim 17, wherein the taxi time information further comprises taxi out time information for the set of aircraft.

* * * * *